United States Patent [19]

Salter, Jr.

[11] 4,286,830
[45] Sep. 1, 1981

[54] COMBINATION ROLL NECK AND BEARING ASSEMBLY

[75] Inventor: Lowell S. Salter, Jr., Shrewsbury, Mass.

[73] Assignee: Morgan Construction Company, Worcester, Mass.

[21] Appl. No.: 78,457

[22] Filed: Sep. 24, 1979

[51] Int. Cl.³ ............ F16C 19/38; F16C 35/06; F16C 43/04
[52] U.S. Cl. ............................ 308/207 R; 308/234
[58] Field of Search ............ 308/207 R, 219, 234, 308/236

[56]  References Cited

U.S. PATENT DOCUMENTS

| | | | |
|---|---|---|---|
| 2,634,178 | 4/1953 | Chievitz | 308/207 R |
| 3,003,836 | 10/1961 | Hill | 308/234 |
| 3,080,199 | 3/1963 | Rickley | 308/234 |
| 3,782,796 | 1/1974 | Rickley et al. | 308/234 |
| 3,799,636 | 3/1974 | Kersting et al. | 308/207 R |
| 3,912,345 | 10/1975 | Overton | 308/207 R |

Primary Examiner—Richard R. Stearns
Attorney, Agent, or Firm—Thompson, Birch, Gauthier & Samuels

[57] ABSTRACT

A bearing assembly for a roll neck in a rolling mill includes as an integral component a force exerting means consisting of a nut threaded on a ring. The ring is detachably mounted by means of a bayonet-type connection in a non-rotatable axially confined position on the roll neck. The nut is engageable with other bearing components and is rotatable relative to the ring to axially force the bearing assembly into and out of its operative position on the roll neck.

11 Claims, 10 Drawing Figures

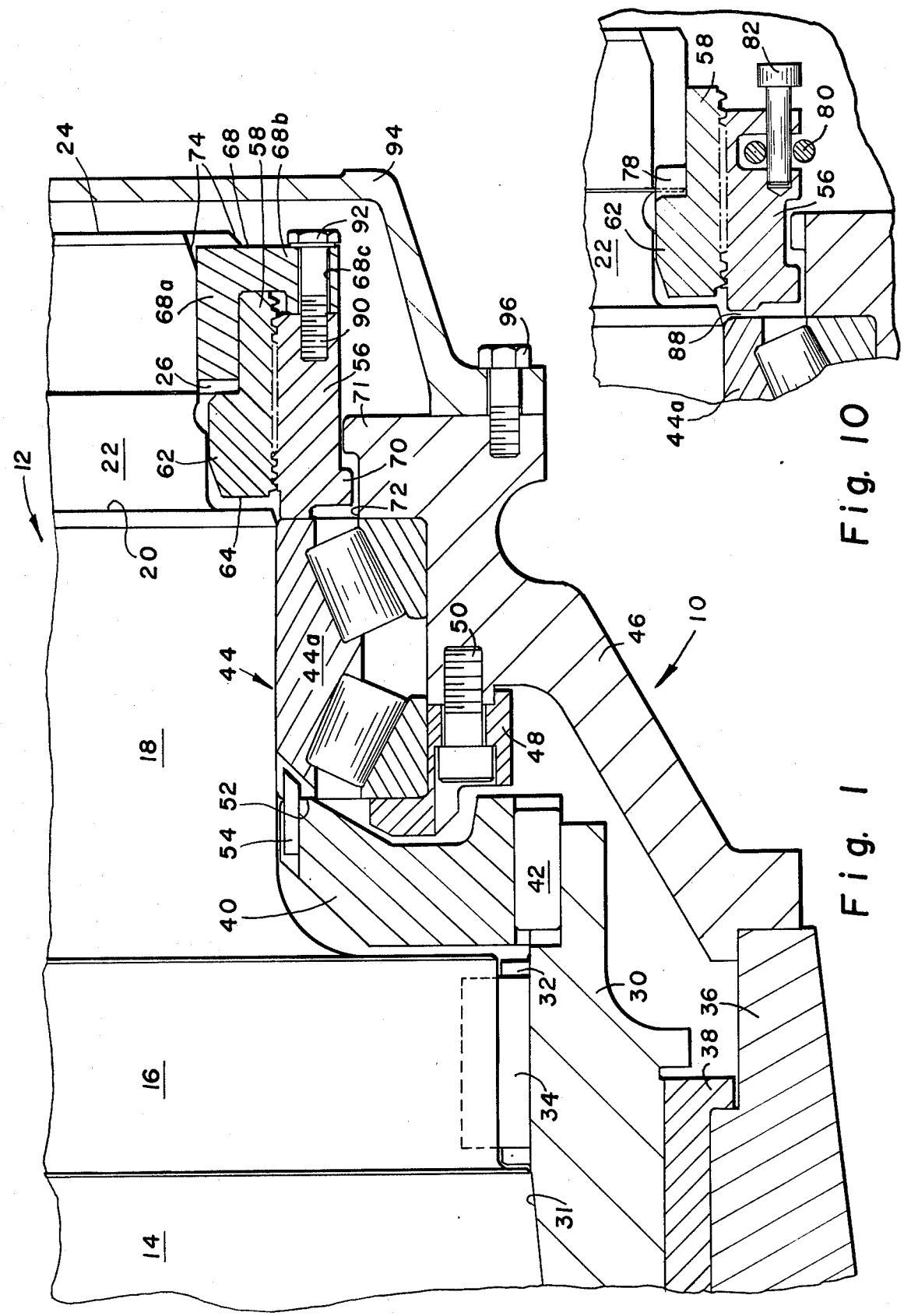

COMBINATION ROLL NECK AND BEARING ASSEMBLY

BACKGROUND OF THE INVENTION

This invention relates generally to roll neck bearing assemblies for rolls in rolling mills.

A well known example of this type of bearing assembly includes as an integral component a mechanical means for axially forcing the bearing assembly into and out of its operative position on the roll neck. The force exerting means consists of a nut mounted on an externally threaded ring. A separable subassembly consisting of a combination clamp ring and key is employed to detachably secure the threaded ring in a non-rotatable axially confined position on the roll neck. The nut is rotatable relative to the axially confined threaded ring and is engageable with other bearing parts. In other similar arrangements, the clamp ring and key are separate components.

Although these types of bearing assemblies have received worldwide acceptance throughout the rolling mill industry, experience has indicated that the clamp rings and keys sometimes present difficulties to maintenance personnel. More particularly, the clamp rings consist of two semi- circular pivotally interconnected ring segments. The key is received in mating keyways in the threaded ring and roll neck to rotatably fix the former relative to the latter. The ring segments are pivotally seated in a circular groove in the roll neck to provide an abutment cooperating with a shoulder on the roll neck to axially confine the threaded ring.

With large bearings, these clamp rings can weigh hundreds of pounds, thus requiring the need of a crane or other lifting device to install or remove them during the mounting or demounting procedures. Furthermore, depending on the orientation of the roll neck and bearing assembly, the semi-circular ring segments may at times exhibit a tendency to pivotally open under their own weight as the bearing assembly is in the process of being mounted on or removed from the roll neck. Mishaps can occur unless proper precautions are taken by maintenance personnel to prevent this from happening. Also, when separated from the roll neck and bearing assembly, the clamp ring and key subassembly can be damaged by mishandling, and it is also vulnerable to being contaminated by dirt, mill scale, etc. This further complicates the task of maintenance personnel.

In another known type of rolling mill roll neck bearing assembly; the integral force exerting means consists of a hydraulically actuated piston-cylinder unit cooperating in conjunction with a manually rotatable locknut. The force exerting means is detachably secured to the roll neck by means of a bayonet-type connection. Such bearing assemblies are prohibitively expensive because of their more complicated design, which includes a greater number of precision machined components. Moreover, the mounting and demounting of such bearing assemblies requires separate hydraulic pump/reservoir units, which further adds to overall costs. Also, the operating costs of such bearing assemblies is increased by the need to maintain hydraulic seals, pumps etc. In addition, the procedures involved in mounting and demounting such bearing assemblies are complicated, due in part to the need for precise positioning and alignment of the bayonet components prior to mounting and demounting.

Still another known type of roll neck bearing assembly employs a separate force exerting means which consists of a nut threaded on a ring, the latter being detachably connected to the roll neck by a bayonet-type mechanism. A number of difficulties are also associated with this type of arrangement. For example, the bayonet mechanism again lacks self alignment features, and thus considerable time and attention is required when coupling and uncoupling its components. Also, the bearing assembly and force exerting means are mounted on and removed from the roll neck separately from each other. This greatly complicates the tack of maintenance personnel, particularly since each such component requires the use of overhead cranes or the like.

SUMMARY OF THE INVENTION

One object of the present invention is the replacement of the separate clamp ring and key subassembly in bearing assemblies of the type described in U.S. Pat. No. 3,080,199 with an improved bayonet connection mechanism.

Another object of the present invention is the provision of an improved bayonet connection mechanism having self-aligning features which simplify the procedures involved in, and shorten the time required to, mount and remove the bearing assembly from the roll neck.

A related object of the present invention is the provision of positive stop means for limiting rotation of the threaded ring into and out of its interlocked position on the roll neck.

A still further object of the present invention is the provision of an improved keying arrangement for rotatably locking the threaded ring on the roll neck.

BRIEF DESCRIPTION OF DRAWINGS

FIG. 1 is a vertical sectional view taken through the lower portion of a rolling mill bearing assembly (thrust side) embodying the concepts of the present invention;

FIG. 10 is a sectional view taken on line 10—10 of FIG. 9.

DESCRIPTION OF PREFERRED EMBODIMENT

Figure 3:
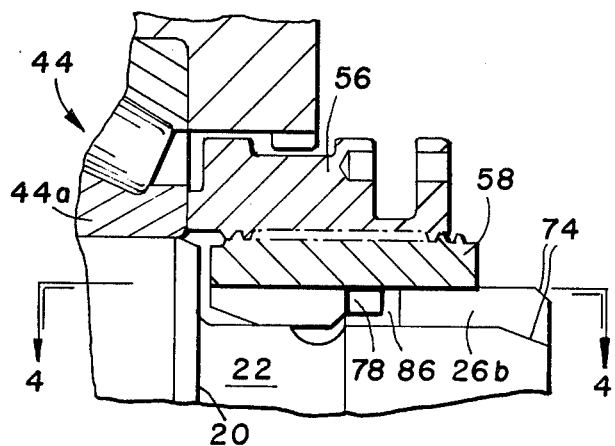
FIG. 3 is a sectional view taken along line 3—3 of FIG. 2.

Referring initially to FIG. 1, a bearing assembly generally indicated at 10 is shown operatively positioned on a roll neck 12. The roll neck includes a truncated conical section 14 merging with a cylindrical section 16. Cylindrical section 16 in turn merges with a reduced diameter cylindrical section 18 which terminates at a shoulder 20 on the inboard side of a circular external groove 22.

Referring additionally to FIGS. 2-6 and 8-9, it will be seen that the external circular groove 22 is spaced from the roll end 24 by a plurality of axially extending external ribs 26. The external ribs 26 are separated by external axially extending slots 28.

A sleeve 30 has a bore 31 tapered to fit tightly on the truncated conical section 14 of the roll neck. Sleeve 30 has a keyway 32 positioned to axially receive a key 34 staked to cylindrical section 16 of the roll neck. Surrounding the sleeve 30 is a stationary chock 36 lined with a bushing 38. As is conventional with bearing assemblies of this type, a high pressure oil film is maintained continuously at the bearing load zone between the sleeve 30 and the bushing 38 when the mill is in operation.

A sleeve ring 40 surrounds the reduced diameter cylindrical neck section 18. Sleeve ring 40 abuts sleeve 30 and is rotationally fixed in relation thereto by means of a second key 42. A roller thrust bearing assembly generally indicated at 44 also surrounds cylindrical neck section 18. The roller thrust bearing assembly 14 is retained within a non-rotatable chock end plate 46 by a retainer ring 48 which is secured to the chock end plate by bolts 50.

Figure 7:
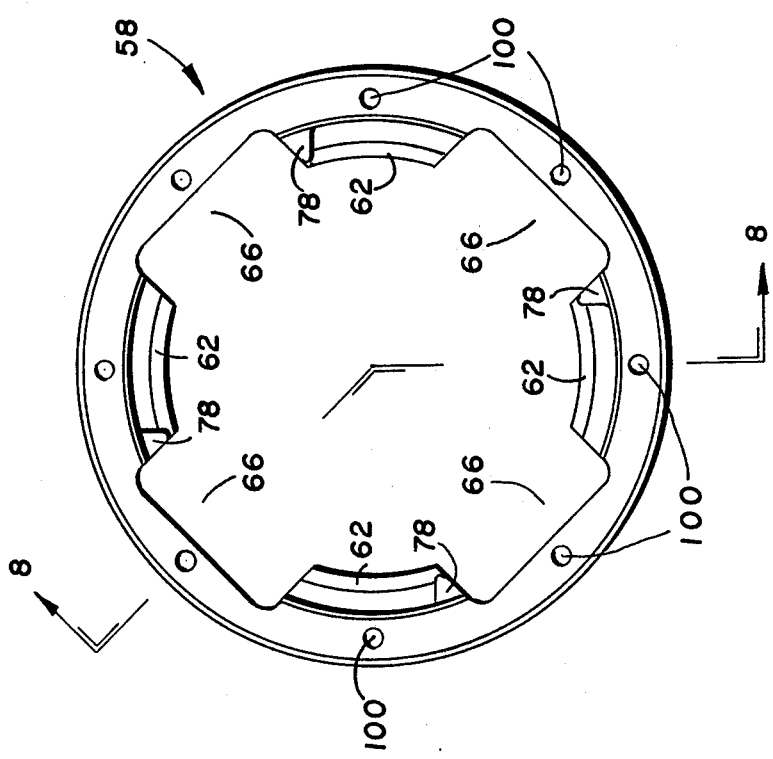
FIG. 7 is an end view of the threaded ring looking from right to left as viewed in FIG. 1.

The inboard end of the inner thrust bearing race 44a engages the sleeve ring 40 at 52 with a third key 54 extending axially therebetween. The outboard end of inner thrust bearing race 44a is engaged by a nut 56 threaded on a cylindrical ring 58. As can best be seen by additional reference to FIGS. 7 and 8, ring 58 has a circular internal groove 60 at its outboard end. A plurality of internal ribs 62 extends axially from the internal groove 60 to the inboard end 64 of the ring. The internal ribs are separated by axially extending internal slots 66.

When the bearing assembly 10 is in its operative position on the roll neck 12 as shown in FIG. 1, the internal ribs 62 of the threaded ring 58 are located within the circular external groove 22 and are checked against axial movement in the outboard direction by engagement with the external ribs 26 of the roll neck. As will hereinafter be described in more detail, rotation of the threaded ring relative to the roll neck is prevented by a detachable locking means consisting of a key member 68. The nut 56 has been tightened on the ring 58 to exert an axial force in the inboard direction on the inner race 44a of the thrust bearing assembly 44. This force is transmitted via the sleeve ring 40 to the sleeve 30, thereby forcibly locating and retaining the bearing assembly in its operative position.

Figure 5:
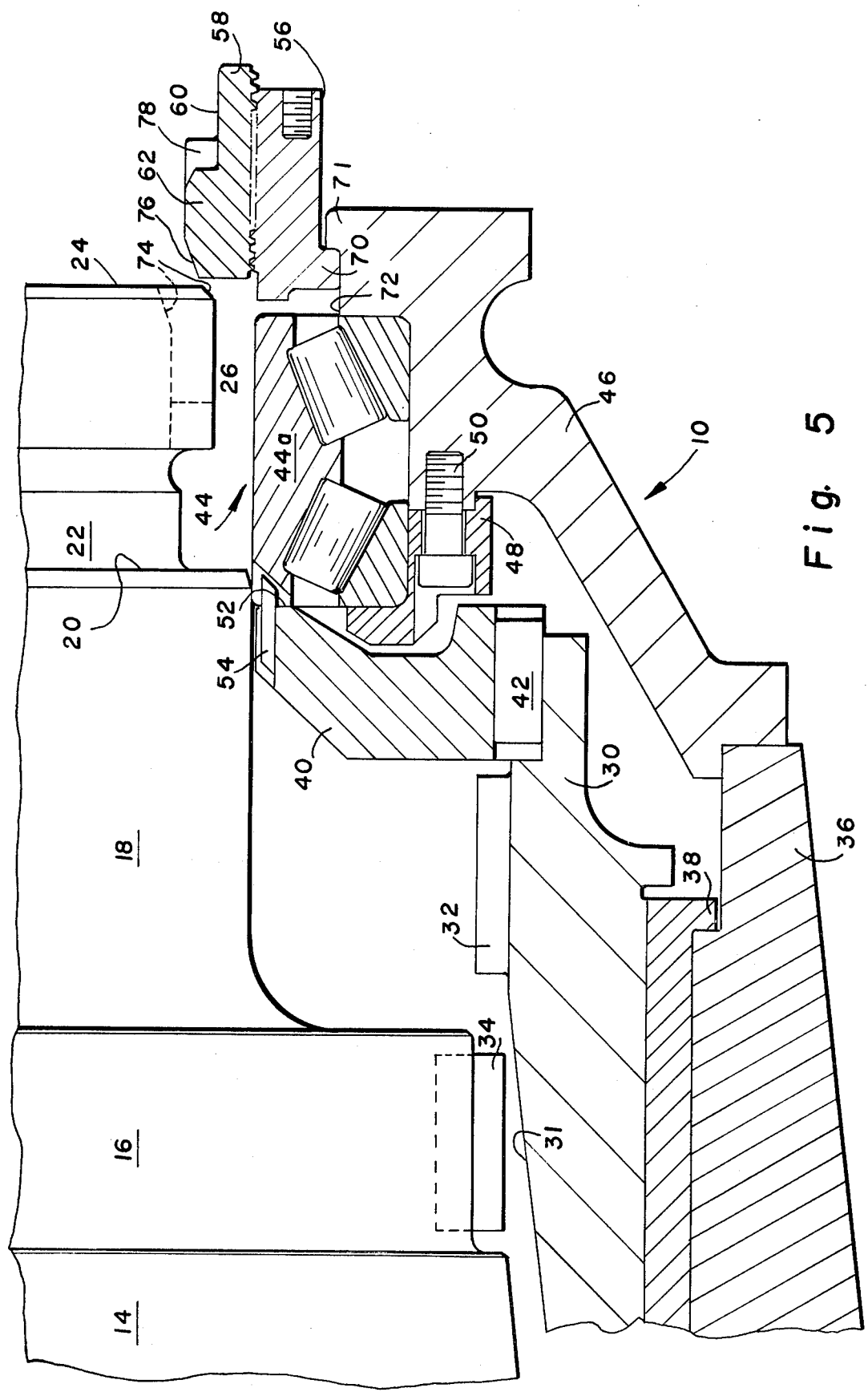
FIG. 5 is a view similar to FIG. 1 showing the bearing assembly immediately prior to its being axially received on the roll end.
Figure 8:
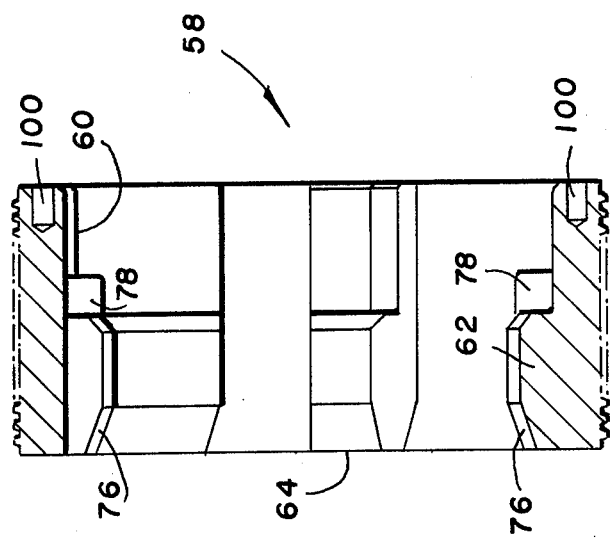
FIG. 8 is a sectional view taken along line 8—8 of FIG. 7.

FIG. 5 shows the bearing assembly 10 immediately prior to its being axially received on the roll neck 12. At this stage the bearing assembly is carried externally by conventional means, for example an overhead crane (not shown). The ring 58 and nut 56 are threadedly interconnected and comprise integral components of the bearing assembly. A radial shoulder 70 on the nut 56 is axially confined by a shoulder 71 on the chock end plate 46, and the nut shoulder 71 is at rest on the bottom of a circular groove 72. It will thus be understood that at this stage, the threaded ring 58 and nut 56 are not aligned coaxially with the remaining components of the bearing assembly 10.

Figure 9:
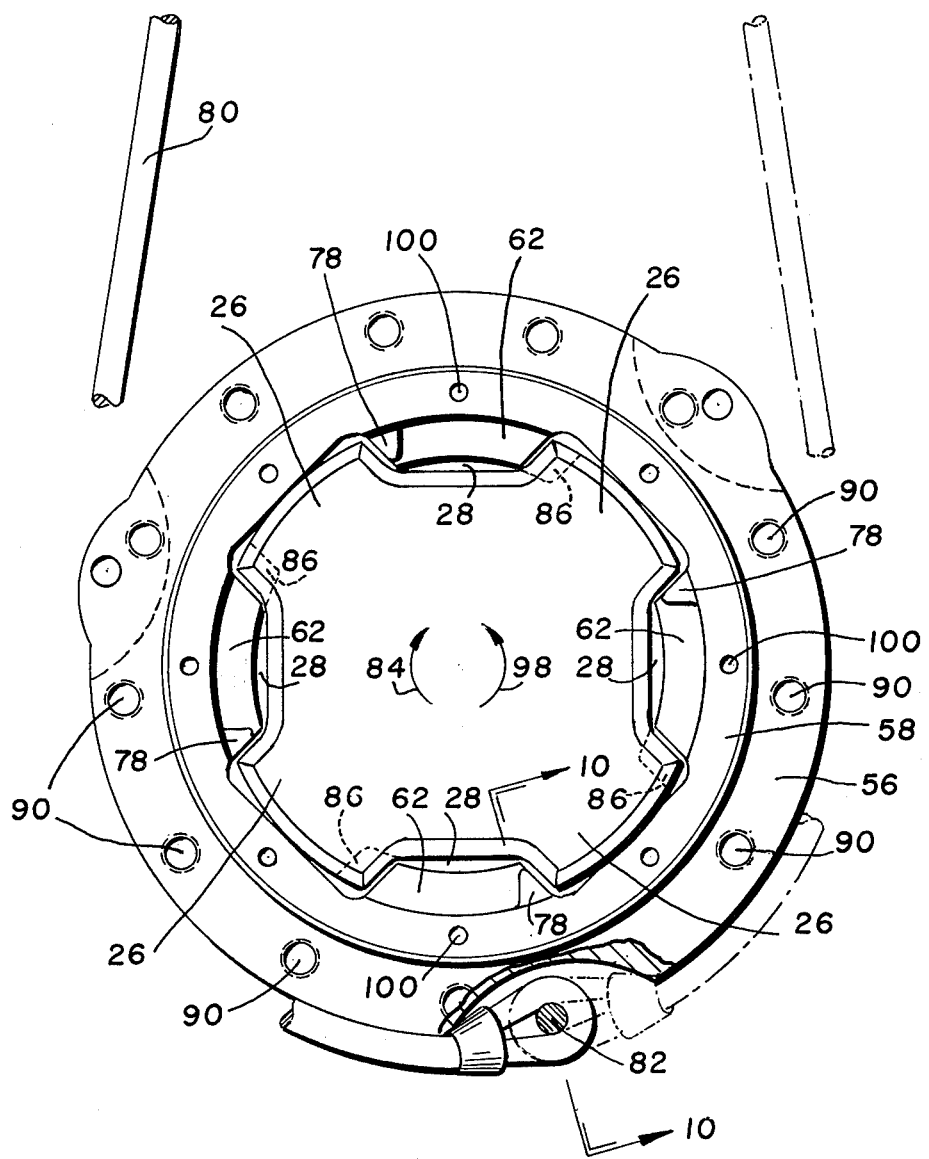
FIG. 9 is an end view similar to FIG. 2 showing the bearing assembly after it has been mounted on the roll neck but before the bayonet connection has been engaged.

The external ribs 26 of the roll neck are provided at their outboard ends with beveled shoulders 74. Beveled shoulders 76 are also provided on the inboard ends of the internal ribs 62 of the threaded ring 58. The shoulders 74, 76 are designed to cooperatively engage during axial movement of the bearing assembly onto the roll neck to provide a self-aligning feature capable of accomplishing one or both of the following: a slight radial lifting of the threaded ring 58 and nut 56 into coaxial alignment with the remainder of the bearing assembly components, resulting in the shoulder 70 being radially spaced from the base of groove 72 as shown in FIG. 1; rotational adjustment of the threaded ring 58 relative to the roll neck in order to position the external ribs 26 and external slots 28 of the roll neck in alignment respectively with the internal slots 66 and internal ribs 62 of the threaded ring. These relative alignments are achieved automatically as the bearing assembly is moved onto the roll neck. The bearing assembly can thus be smoothly and rapidly slid onto the roll neck to an intermediate position as shown in FIGS. 9 and 10, with the internal ribs 62 located within the external groove 22 of the roll neck.

At least some and preferably all of the internal ribs 66 are provided with stop members 78 protruding axially therefrom into the internal groove 60. The stop members 78 can comprise integral extensions of the ribs 62. Alternatively, the stop members can consist of pins or the like seated in holes in the ends of the internal ribs 62. When the bearing assembly is in the intermediate position shown in FIGS. 9 and 10, the stop members 78 are located at the position indicated by the phantom lines at 78' in FIG. 4. In other words, the stop members protrude into the external slots 28 between the external ribs 26 and are in contact with the rib sides 26a.

At this juncture, appropriate blocks or other support means (not shown) are placed under the bearing assembly and the overhead crane is disconnected. Thereafter, as shown in FIGS. 9 and 10, the crane cable 80 is secured to the nut 56 by means of a pin 82 passed through the eye at the end of the cable. The cable may then be wrapped around the nut 56 for a desired number of turns. Thereafter, by pulling up on the cable 80, the combination of the nut 56 and threaded ring 58 will be rotated in the direction indicated by arrow 84 in FIG. 9 until the stop members 78 are received in notches 86 in the sides 26b of the ribs 26. When this occurs, the threaded ring is rotationally checked automatically in a fully interlocked position, with the internal ribs 62 and internal slots 66 in axial alignment respectively with the external ribs 26 and external slots 28 of the roll neck. As the pulling action continues on the crane cable 80, the nut 56 will be rotated relative to the threaded ring 58 in the direction 84 to close the gap 88 (see FIG. 10) between the nut and the inner thrust bearing race 44a. When the gap 88 has been closed, continued rotation of the nut 56 will produce a slight shifting of the threaded ring 58 in the outboard direction until the internal ribs 62 are checked against the external ribs 26. Thereafter, continued rotation of the nut will generate an axial force which will push the entire bearing assembly into its operative position, with the tapered bore 31 of sleeve 30 in tight engagement on the tapered section 14 of the roll neck.

Once this has been accomplished, the key member 68 is installed. As previously indicated, when the threaded ring 58 is rotated to seat the stop members 78 in the notches 86, the internal slots 66 are automatically aligned with the external slots 28. This facilitates smooth insertion of the key member 68. As is best shown in FIGS. 1 and 2, the base 68a of the key member bridges the gap between a confronting set of slots 28, 66 and thus mechanically secures the threaded ring 58 against rotation relative to the roll neck.

Figure 2:
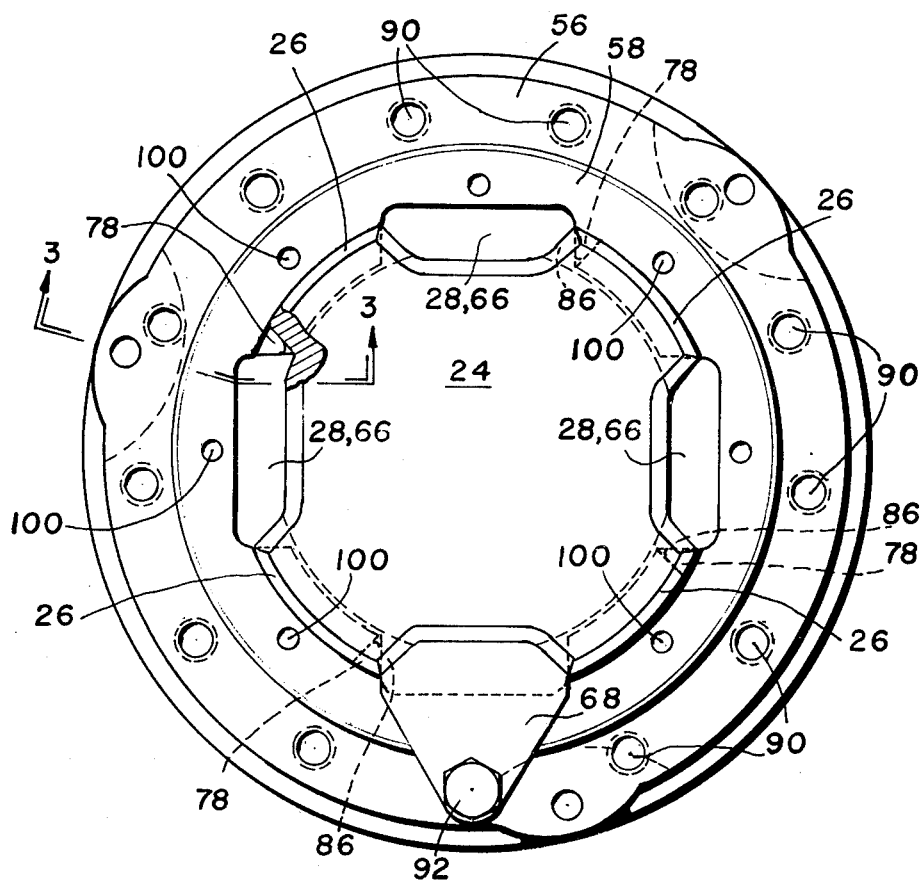
FIG. 2 is an end view of the bearing assembly shown in FIG. 1 with the end cover removed and with an end portion of the roll neck broken away.
Figure 4:
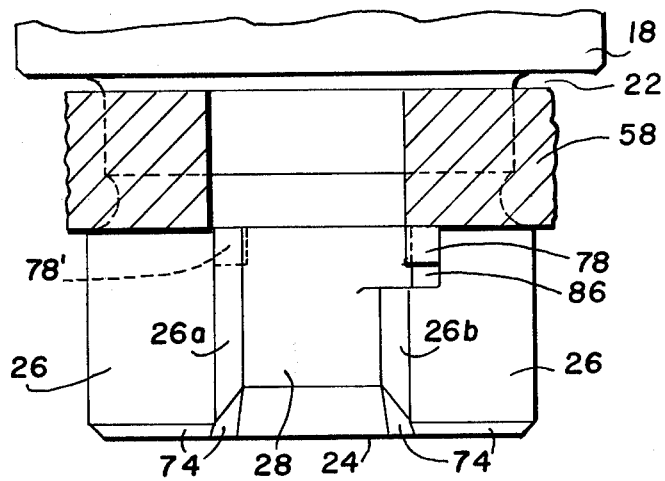
FIG. 4 is a sectional view taken along lines 4—4 of FIG. 3.
Figure 6:
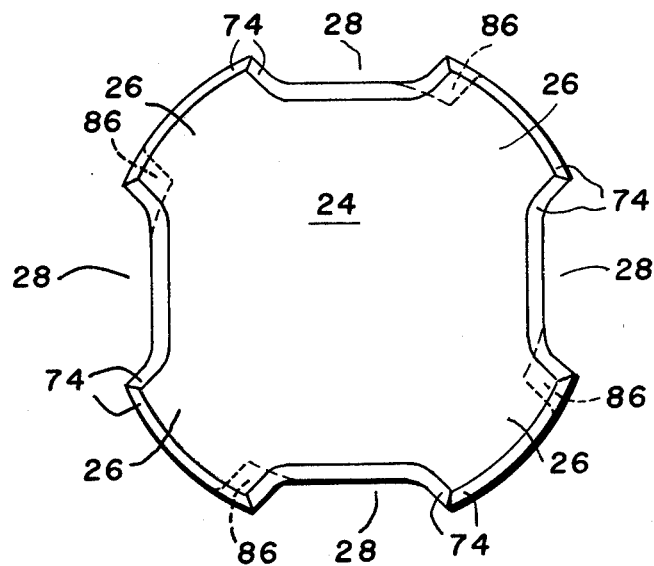
FIG. 6 is an end view of the roll neck looking from right to left as viewed in FIG. 1.

As is best shown in FIGS. 2 and 9, the outboard face of the nut 56 is provided with a plurality of threaded receiving apertures indicated typically at 90. The key member 68 is provided with a radially extending leg 68b which overlies the outboard face of the nut. Leg 68b has an opening 68c extending therethrough. The location of the key member 68 in a particular set of aligned confronting slots 28, 66 is governed by the relative alignment of opening 68c with one of the threaded receiving apertures 90 in the nut 56. To facilitate such relative alignment, preferably the quotient of the number of receiving apertures 90 divided by the number of confronting sets of slots 28, 66 is not a whole number. For example, in the embodiment herein disclosed, there are four sets of confronting slots 28, 66, and thirteen threaded apertures 90. Thus, the relative radial alignment of the sets of slots 28, 66 to the threaded receiving apertures 90 will be slightly different, thereby providing a "vernier" relationship which increases the likelihood that one set of slots 28, 66 will be properly aligned with a given threaded receiving aperture 90. Should this desired radial alignment not be present, the nut 56 can be either tightened or loosened additionally. The aforesaid vernier relationship between the slot sets 28, 66 and the threaded apertures 90 minimizes the need for such additional adjustments, thus providing more control over the retaining force exerted on the bearing components. Once the opening 68c is in proper axial alignment with a threaded receiving aperture 90, the key member 68 is connected to the nut 56 by means of a bolt 92. This mechanically secures the nut 56 against rotation relative to the threaded ring 58. The pin 82 and crane cable 80 may then be disengaged from the bearing assembly. Thereafter, an end cover 94 is attached to the chock end plate 46 by means of bolts 96 to complete the mounting procedure.

When demounting the bearing assembly, essentially the reverse procedure is followed. The bearing assembly is first externally supported by appropriate blocks (not shown) and the end cover 94 is removed. The crane cable 80 is then attached in the manner shown by the phantom lines in FIG. 9. The locking bolt 92 is then removed, thereby freeing the nut 56 for rotation relative to the threaded ring 58. A pulling force is exerted on the crane cable 80 in order to rotate the nut 56 in the direction indicated by the arrow 98 in FIG. 9. This will cause the threaded ring 58 to move in the inboard direction until its inboard end 64 contacts the shoulder 20 on the roll neck. Thereafter, continued rotation of nut 56 in the direction of arrow 98 will move the nut in an outboard direction until its shoulder 70 engages the shoulder 71 on chock end plate 46. This engagement will produce a force which will pull the bearing assembly off of its tightly seated operative position on the roll neck.

At this juncture, the key member 68 will be removed, and the threaded ring 62 will be rotated in the direction of arrow 98 to the position shown in FIG. 9 with the stop members 78 engaging the sides 26a of the external ribs 26. This rotation can be accomplished either by continuing to rotate the nut 56, or by employing an appropriate tool such as a spanner wrench engageable with the holes 100 in the outboard face of the ring 58. As soon as the stop members reengage the rib sides 26a (as shown at 78' in FIG. 4), the bearing components are aligned automatically as shown in FIG. 9, and the bearing is free to be axially removed from the roll neck. This is to be contrasted to known bayonet connections for rolling mill bearing assemblies, where alignment of bayonet components does not occur automatically, thus requiring more effort and attention on the part of maintenance personnel.

In light of the foregoing, it will now be appreciated by those skilled in the art that the present invention embodies a number of improvements and advantages over known conventional rolling mill bearing assemblies. For example, the cost and operational advantages of an integral mechanical (as opposed to hydraulic) force exerting means are retained in combination with a bayonet-type interlocking mechanism. This eliminates the disadvantages associated with the use of separable clamp ring assemblies. The bayonet-type interlocking mechanism embodies self-aligning features which simplify coupling and uncoupling, and thus make it much easier for maintenance personnel to mount and demount the bearing assemblies.

I claim:

1. In a rolling mill, the combination of a roll having a roll neck rotatably supported in a bearing assembly which includes as an integral component a force exerting means consisting of a nut threaded on a ring, the ring being detachably mounted in a non-rotatable axially confined position on the roll neck, and the nut being engageable with other bearing components and being rotatable relative to the ring to axially force the bearing assembly into and out of its operative position on the roll neck, the improvement comprising:

a circular external groove in the roll neck at a location spaced inwardly from the end thereof;

a plurality of external ribs on the roll neck extending axially from the roll end to said external groove, said external ribs being separated by external slots in the roll neck;

a plurality of internal ribs extending axially along the interior of said ring, said internal ribs being separated by axially extending internal slots in said ring;

the arrangement of said external groove and said internal and external ribs and slots being such that when said external ribs and slots are in axial alignment respectively with said internal slots and ribs, said bearing assembly is movable axially relative to the roll neck between an inoperative position removed from the roll neck and an intermediate position at which the internal ribs of said ring are located within the external groove on said roll neck, whereupon said ring may be rotated relative to said roll neck between said intermediate position and an interlocked position at which said internal ribs and slots are in alignment respectively with said external ribs and slots; and, detachable locking means for rotatably fixing said ring relative to said roll neck.

2. The apparatus of claim 1 further comprising stop means for limiting rotation of said ring relative to said roll neck between said intermediate and interlocked positions.

3. The apparatus of claim 2 wherein said ring is provided with a circular internal groove at the outboard end thereof, and wherein said stop means comprises a stop member on at least one of said internal ribs protruding axially into said internal groove.

4. The apparatus of claim 3 wherein said stop member consists of an integral extension of the internal rib.

5. The apparatus of claims 2, 3 or 4 further comprising notch means in said external ribs for receiving said stop means when said ring is rotated to said interlocked position.

6. The apparatus of claim 3 wherein the internal slots in said ring extend axially across said internal groove, and wherein said detachable locking means consists of a key member axially received in a confronting set of said internal and external slots to bridge the gap therebetween.

7. The apparatus of claim 6 wherein said key member is provided with a radially extending leg overlying the outboard face of said nut, and connecting means extending through an opening in said leg into one of a plurality of receiving apertures in said face.

8. The apparatus of claim 7 wherein the quotient of the number of receiving apertures in said face divided by the confronting sets of said internal and external slots is not a whole number.

9. The apparatus of claims 7 or 8 wherein said connecting means comprises a bolt extending through said opening into threaded engagement with one of said receiving apertures.

10. The apparatus of claim 1 further comprising cooperatively engageable means on said ring and said roll neck for rotatably and axially aligning said ring relative to said roll neck in response to axial movement of said bearing assembly from said inoperative position to said intermediate position.

11. The apparatus of claim 10 wherein said means comprises beveled shoulders on the outboard ends of said external ribs and on the inboard ends of said internal ribs.

* * * * *